United States Patent [19]

Cassagne et al.

[11] Patent Number: 4,894,006

[45] Date of Patent: Jan. 16, 1990

[54] BURNER SYSTEM IN PARTICULAR WITH A HIGH VELOCITY OF THE BURNT GASES

[75] Inventors: Jean-Pierre Cassagne, Fontenay Sous Bois; Laurent Scrive, Paris, both of France

[73] Assignee: Gaz De France, Paris, France

[21] Appl. No.: 204,757

[22] Filed: Jun. 10, 1988

[30] Foreign Application Priority Data

Jun. 11, 1987 [FR] France ................ 87 08147

[51] Int. Cl.[4] .............................................. F23L 15/00
[52] U.S. Cl. ..................................... 431/116; 431/158; 431/160
[58] Field of Search ............... 431/115, 116, 158, 154, 431/215, 239, 242, 264, 354; 126/91 A, 360 R; 60/39.31, 39.32, 39.511, 266, 753, 756

[56] References Cited

U.S. PATENT DOCUMENTS

| | | |
|---|---|---|
| 2,478,732 | 8/1949 | Wilson et al. . |
| 4,021,186 | 5/1977 | Tenner . |
| 4,104,017 | 8/1978 | Alin . |
| 4,373,903 | 2/1983 | Wunning .................... 431/160 X |
| 4,441,879 | 4/1984 | Wagner et al. ............. 431/116 X |
| 4,493,309 | 1/1985 | Wedge et al. ............... 431/116 X |
| 4,525,138 | 6/1985 | Snyder et al. . |
| 4,586,894 | 5/1986 | Wunning ..................... 431/158 |

FOREIGN PATENT DOCUMENTS

| | | |
|---|---|---|
| 0164576 | 12/1985 | European Pat. Off. . |
| 2243604 | 5/1973 | Fed. Rep. of Germany . |
| 2314118 | 7/1974 | Fed. Rep. of Germany . |
| 2940245 | 4/1981 | Fed. Rep. of Germany . |
| 1099232 | 1/1968 | United Kingdom . |
| 2175684 | 12/1986 | United Kingdom . |

Primary Examiner—Randall L. Green
Attorney, Agent, or Firm—Kenyon & Kenyon

[57] ABSTRACT

A burner system comprising a central hearth tube defining a combustion chamber for a mixture of gas and air and made from thermomechanical ceramic, a tubular element comprising at its end located towards the gas outlet a radial restriction forming an axial and radial positioning stop for the hearth tube whereas the assembly of the latter to the other component parts of the burner is effected by a spring adapted to produce an axial pressure force under the impact of which the hearth tube is bearing upon said stop through a radial shoulder provided in its reduced portion, the burner providing a high velocity of outflow of the burnt gases.

21 Claims, 4 Drawing Sheets

BURNER SYSTEM IN PARTICULAR WITH A HIGH VELOCITY OF THE BURNT GASES

The present invention relates essentially to a burner system in particular with a high exit speed or exhaust velocity of the burnt gases, comprising a central hearth tube forming a combustion chamber into which the mixture of combustible gas or gaseous fuel and of combustion-supporting gas such as air is admitted, a tubular element coaxially surrounding the hearth tube thus forming an annular space thereabout through which the combustion-supporting air to be admitted into the hearth tube is flowing, the latter being advantageously formed at the burnt gas outlet end with a reduced portion to increase the outflow speed of the gases.

In known burners of this kind, the hearth tube forming a combustion chamber as well as the other components of the burner are made from a suitable metal, for instance of steel.

A major inconvenience of the burner of this type is due to the chemical and thermal behavior of the material of the hearth tube which prevents the achievement of a satisfactory heat efficiency of the burner and is inconsistent with the high temperatures produced in the combustion chamber, if particular, complicated and expensive measures of thermal protection are not taken. Another major drawback of the known burners consists in the excessive rate of production of nitrogen oxide.

The object of the present invention is to provide a burner system of the type in particular with a high outflow velocity of the burnt gases, which does not suffer from the substantial inconveniences of the known burners which have just been stated.

To reach that goal, the system according to the invention comprises a burner which is characterized in that the hearth tube is made from thermomechanical ceramic, in that the outer tubular element comprises at its end located towards the gas outlet a radially restricted or narrowed portion, shoulder or flange which forms an axial and radial positioning stop or like abutment for the hearth tube and in that the assembly of the latter with the other component parts of the burner is carried out under the effect of a means likely to produce an axial pressure force under the impact of which the hearth tube would bear against said stop or abutment through a radial shoulder provided in its reduced portion or neck.

According to an advantageous characterizing feature of the invention, the hearth tube defining the combustion chamber comprises a predetermined number of air feed planes which are axially offset or shifted in the direction of flow of the burnt gases and of the type providing a tangential introduction of air in counter-rotating relationship so as to produce a stepwise or staged combustion for decreasing the rate of production of nitrogen oxides.

According to another advantageous characterizing feature of the invention, air feeds located in a first plane substantially at the gas feed are adapted to provide for an incomplete and not very strong combustion, the air feeds located in a second plane in counter-rotating relation to the air feeds of the first plane are adapted to accelerate the combustion so that the air-to-gas ratio be about the stoechiometric value whereas the air feeds in a third plane are adapted to terminate the combustion.

According to still a further advantageous characterizing feature of the invention, the burner comprises an outer tubular shell providing an annular space about the tubular element surrounding the hearth tube which allows the recirculation of the burnt gases after their flow through a heating device advantageously of the glove finger-shaped radiant tube type with recirculation.

According to still another advantageous characterizing feature of the invention, in a burner according to the invention of the regenerative type, the aforesaid tubular element consists of an advantageously finned heat exchange tube separating the combustion air flow from the gases circulating in counter-current relation to the air flow.

According to an advantageous characterizing feature of a system according to the invention with a burner of the regenerative type, the radiant tube comprises an outer casing tube the axial extension of which forms the aforesaid outer tubular shell of the burner and an inner ceramic tube positioned in axial extension of the hearth tube of the burner and consisting of a number of sections axially interconnected through flexible pivotal connecting means.

The invention will be better understood and further objects, characterizing features, details and advantages thereof will appear more clearly as the following explanatory description proceeds with reference to the accompanying diagrammatic drawings given by way of non-limiting examples only illustrating several presently preferred specific embodiments of the invention and wherein.

Figures 1, 2, 9:
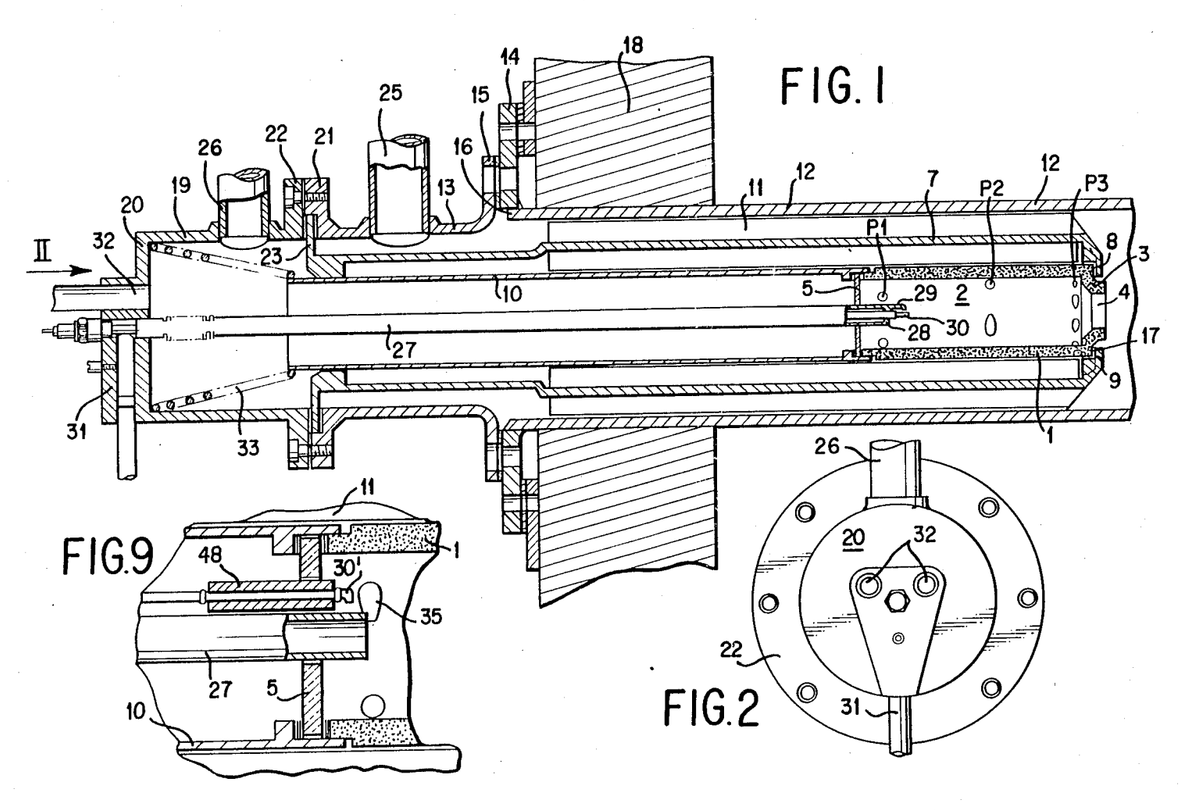
FIG. 1 is a view in axial section of a burner according to the present invention.
FIG. 2 is a view seen in the direction of the arrow II of FIG. 1.
FIG. 9 is a view in axial section with parts broken away of an alternative embodiment of the ignition device of a burner according to the invention.

FIG. 1 shows a burner with a high outflow speed of the burnt gases according to the present invention. This burner essentially comprises a hearth tube 1 made from thermomechanical ceramic which defines the combustion chamber 2 of the burner and exhibits a simple shape with a reduced portion or neck 3 at the outlet end for the burnt gases to impart a strong momentum to the combustion products at their exit from the burner. On the side opposite from the outlet 4 defined by the reduced portion or neck 3, the combustion chamber 2 is closed by a transparent disc 5. A tubular element 7 coaxially surrounds the hearth tube 1. This tubular element 7 comprises at its end positioned towards the outlet 4 for the burnt gases a radial restriction or narrowing which forms an axial positioning stop or abutment 8 for the hearth tube 1 which coaxially surrounds the reduced portion or neck 3 thereof. The hearth tube 1 bears against this stop or abutment 8 through a radial annular shoulder 9 provided in the reduced portion 3 with the interposition of a sealing joint, gasket or like packing 17. The tubular element 7 also coaxially surrounds a tube 10 which is placed in axial extension of the hearth tube 1 on the side of the closure disc 5 of the combustion chamber. The tube 10 has the same diameter as the hearth tube 1.

On FIG. 1 which shows a burner according to the invention shaped as a regenerative burner, the tubular element 7 is made as a heat exchanger from refractory alloy with fins 11. This heat exchanger is made up of sections having each one a certain length, for instance 90 mm, which are welded to each other. An outer tubular shell 12 and a tube section 13 which is arranged in the axial extension of the tube 11 coaxially surround the heat exchanger 7. At their confronting ends, the tubes 12 and 13 are provided with flanges 14 and 15, respectively, which allow the connection of the tubes to each other with the interposition of a sealing joint, gasket or like packing 16 and the fastening of the burner to a wall diagrammatically shown at 18 for instance of a furnace or oven. The space defined by the tubes 12 and 13 is closed on the side opposite to the hearth tube 1 by a tubular casing element 19 which is positioned in the axial extension of the tube 13 and is closed at its free end by a wall 20 extending at right angles to the centre line axis of the tubular assembly. The confronting ends of the tube 13 and of the casing element 19 are provided with connection flanges 21, 22, respectively. It is seen that the heat exchanger 7 is kept at its end opposite to its stop nose 9 for the positioning of the hearth tube between the flanges 21 and 22 by radially outwards projecting members 23. The tube section 13 is provided with a branch piping 25 for the discharge of the burnt gases whereas the casing element 19 is fitted with a branch piping 26 for the feed of the combustion air. It is seen that the heat exchanger 7 separates the combustion air flow streaming into the burner 26 from the burnt gases which are circulating in counter-current relationship and are flowing out of the burner through the branch pipe 25.

The feed of the gases is provided by a supply tube 27 which extends along the centre line axis of the tube 10 from the wall 20 of the casing element 19 into the combustion chamber 2 through the transparent disc 5. The gases would flow into the chamber 2 through holes or ports 28 for instance six in number which are angularly distributed on the duct forming a gas pipe 27 near its end. The pipe 27 carries at its end a high voltage ignition device. The earth electrode shown at 29 is welded to the pipe whereas the high voltage electrode designated by the reference numeral 30 is located along the centre line axis thereof. It consists of a rod made from a refractory alloy and placed within an alumina sheath. The gas is supplied to the pipe 27 through a duct 31 formed in the wall 20 of the casing element 19. This wall 20 comprises windows 32 transparent to the ultraviolet radiations so as to allow to see the flame by means of an ultraviolet sensing or detecting cell.

In the embodiment according to FIG. 1, a coil spring 33 is arranged inside of the burner and has the function to provide for the assembly of the hearth tube 1 made from thermomechanical ceramic inside of the burner by its axial pressure force alone. For that purpose, the spring is interposed between the free end of the tube 10 and the wall 20. Under the action of the pressure force exerted by the spring 33, the hearth tube 2 and the tube 10 are kept axially aligned in registering relationship, the hearth tube 1 bearing with its shoulder 9 upon the stop or abutment 8 provided in the nose of the heat exchanger 7. Under the action of the spring 33, the hearth tube is positioned in axial and radial relationship within the nose of the exchanger through its reduced portion or neck 3.

Figure 10:
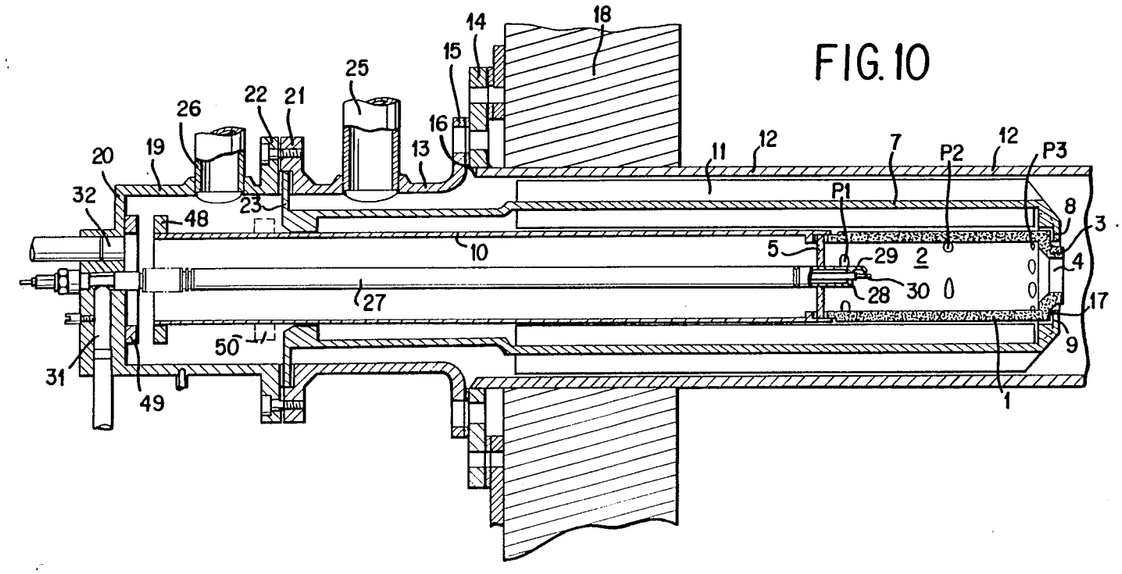
FIG. 10 is a view in axial section of another embodiment of the burner according to the invention.

In the embodiment shown on FIG. 10, the means for assembling the hearth tube 1 made of thermomechanical ceramic through an axial force within the burner essentially comprises two annular magnets 48, 49 one 48 of which is arranged on the tube 10 at the open end thereof whereas the other magnet 49 is mounted on the end wall 20 of the shell of the burner. Both magnets 48, 49 are located in confronting relationship in the axial direction of the burner so that their ends with the same polarities be axially opposite to each other to produce an axial repelling force providing for the assembly of the various component elements of the burner.

On FIG. 10 has been shown in discontinuous lines another possibility of assembling with the assistance of magnet means. In that instance, one single magnet shown at 50 would be sufficient. This magnet is arranged on the outer surface of the tube 10 near a metallic member made fast or integral with the shell of the burner on the tube side opposite from that co-operating with the hearth tube 1. The stationary metal part consists advantageously of the members 23 of the heat exchanger 7 which extend at right angles to the centre line axis of the burner. It is easily understood that the assembling force consists of the attractive or pulling force provided between the ring-shaped magnet 50 and the metal members 23 of the tube 7.

Referring in particular to FIGS. 1 and 3 to 5, the specific structural means of the system for supplying combustion air into the combustion chamber are described hereinafter.

On FIG. 1, the hearth tube 1 comprises three air feed planes P1, P2 and P3 which are axially spaced from each other. Each plane comprises a number of tangential holes 35 which are located in a same plane extending at right angles to the centre line axis of the hearth tube and allow the intake of the gases from the heat exchanger 7 into the combustion chamber 2 along substantially tangential paths of travel. According to the embodiment shown on FIG. 3, the hearth tube comprises five air feed planes P11, P12, P21, P22 and P3. In these two embodiments of the hearth tube 1, all the air is injected into the combustion chamber 2. In the embodiments shown on FIGS. 4 and 5 which also comprise three and five air feed planes, respectively, the feed plane which is remotest from the bottom or end wall of the combustion chamber, i.e. the third plane on FIG. 4 and the fifth plane on FIG. 5, comprise holes 36 which are provided in the nose of the burner and allow to inject the combustion air directly into the flame at the outlet 4 of the combustion chamber after the reduced portion 3.

As to the air feed holes, it is seen that the first air feed plane is located substantially at the gas inlet ports 28 of the gas pipe 27. In the embodiment with three air feed planes according to FIG. 1, both first planes P1, P2 in the direction of motion of the fluids consist of four tangential holes, the holes of one plane being angularly offset or staggered for instance by 45° with respect to the holes of the other plane and are tangentially oriented in opposite directions. The third plane P3 located at the nose of the burner comprises eight tangential holes angularly distributed in a reverse direction with respect to the holes of the plane P2. In the embodiment with five air feed planes according to FIG. 3, the four planes P11 to P22 exhibit each one four tangential holes regularly distributed about the centre line axis of the hearth tube 2 and oriented in opposite directions from one plane to the other one. The fifth plane P3 located at the nose of the burner comprises eight tangential holes oriented in the opposite direction from the holes of the plane P22. In the embodiments shown on FIGS. 4 and 5, the planes of air feed holes extending throught the wall of the hearth tube 1 comprise each one four tangential holes 35 regularly distributed around the centre line axis of the tube. The holes of one plane are angularly offset or staggered with respect to the holes of the other plane for instance by an angle of 45° and are oriented in the tangential direction reverse from that of the holes of the adjacent planes. The last air feed plane adapted to inject the air directly into the flame at the outlet of the burner comprises eight holes 9 which do not extend through the wall of the tube as shown on the Figures.

FIG. 9 shows another embodiment of a high voltage ignition device according to the invention. It is seen that in this embodiment the duct 27 forming a gas pipe is fully open at its end located inside of the combustion chamber 2. The gas feed is therefore performed axially thereby permitting to dispense with or to omit the radial holes 28 according to FIG. 1. The high voltage electrode shown at 30' now extends in parallel relation to the pipe 27. To provide for its correct and reliable positioning, it is retained by an insulating alumina tube 48 which surrounds it coaxially and extends through the transparent disc 5. The earthed electrode consists advantageously of the pipe 27.

This embodiment of the ignition device allows the detection or sensing of the flame directly by means of a suitable control cell fitted into the wall 20 of the shell element 29. Unlike the embodiment shown on FIG. 1, the ultraviolet waves or radiation emitted by the flame would not travel through the end wall or bottom of the combustion chamber 2, i.e. the disc 5, in order that the flame may be controlled. This would permit an effective control of the flame even in the case of a darkening of the end wall or bottom of the combustion chamber by polluted gaseous fluids.

Figures 6, 7, 8:
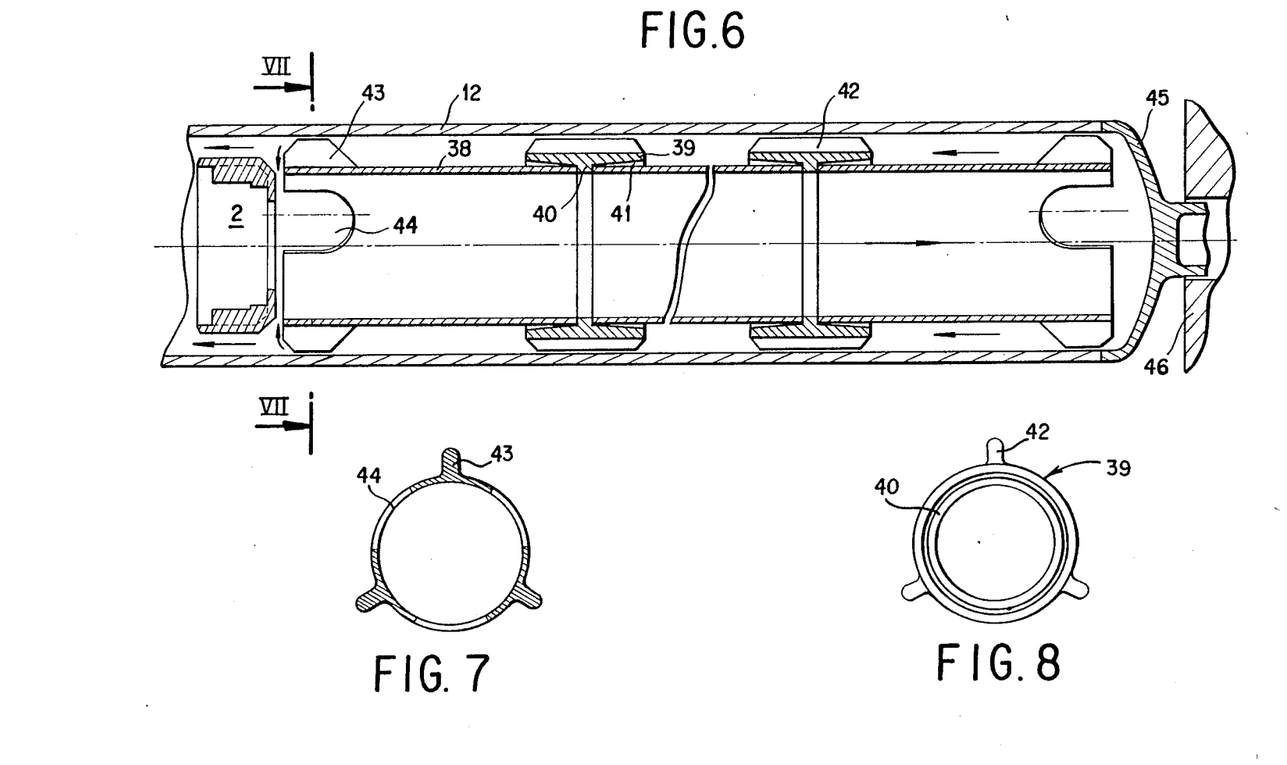
FIG. 6 is a view in axial section of a radiant tube with recirculation according to the invention adapted to co-operate with a burner according to the present invention.
FIG. 7 is a view in cross-section taken upon the line VII—VII of FIG. 6.
FIG. 8 is an axial view of a sleeve for pivotally connecting two sections of the inner tube according to the present invention.

Referring now to FIGS. 6 to 8, that part of the heating system with recirculation of the burnt gases which is located in the axial extension of the burner and forms a glove finger-shaped radiant tube will be described. At 12 is shown the outer tubular shell 12 which also surrounds the burner device. This tube 12 axially surrounds an inner tube 38 made from thermomechanical ceramic and which consists of a number of axially aligned sections which are connected to each other in pivotally movable relationship by means of flexible or yielding connecting means. Each one of these means is made as a ceramic sleeve or bushing 39 coaxially surrounding the ends of both adjacent tube sections, respectively. The radially inner surface of such a sleeve 39 comprises in the middle of its length an annular collar which projects radially inwards and fits between both ends of the sections to be interconnected. The inner diameter of the cylindrical collar 40 corresponds essentially to the inner diameter of the tube sections 38 whereas the outer diameter of the annular collar is a little greater than the outer diameter of the tube so as to leave some radial play or clearance. The inner surface portions 41 located on either side of the collar 40 have a diameter which gradually increases towards the ends of the sleeve. The increase in diameter is determined so as to enable the various sections to follow through a suitable axial offset the creeping motion of the shell tube 12 made from a refractory metal alloy. Each sleeve 39 comprises on its outer cylindrical surface ribs 42 for centering within the outer shell 12. The first and the last tube sections 38 comprise at their ends centering ribs 43 and U-shaped cutouts or ears 44 formed in the cylindrical wall of the section between any two centering ribs 42. The inner tube 38 thus built up is open at both of its ends thereby allowing the circulation of the burnt gases flowing out of the combustion chamber 2 into the tube 38 and into the annular space provided between the inner tube 38 and the shell tube 12 in the way shown by arrowed lines. It is further seen that the tubular shell 12 is closed at its end remote from the burner by a closure member 45 adapted to be fitted into a wall for instance of a furnace or oven diagrammatically shown at 46.

Owing to the provision of the ears 44, the radiant tube may be used even in vertical position. As a matter of fact, the ears provide for an adequate circulation of the combustion gases even though the last tube section 38 is bearing upon the end wall or bottom of the shell subsequent to an axial displacement of this section or of several sections. For that purpose, the axial half length of a section 39 should be greater than the sum of the axial plays or clearances between the tube 38 and the adjacent elements and the various sections.

Since the tube sections 38 according to the invention have constant inner and outer diameters throughout their lengths, it is possible to adapt the tube to any useful length by merely cutting the sections or one section to the desired length or building up a tube from a number of standard modules of differing lengths.

The operation of a burner with a high outflow speed of the gases and of a self-regenerative burner of this kind as well as the operation of the glove finger-shaped radiant tubes being known, it is only necessary to hereinafter describe those aspects which are specific to the invention.

It should at first be pointed out that in the burner according to the invention, the mounting of the metal alloy parts and of the thermomechanical ceramic hearth tube by the axial pressure force alone produced by the spring 33 provides an optimum solution which fully removes any problem which might arise on account of very different thermomechanical behaviours of these two types of materials. In the radiant tube, the assembly through pivotal connection of the various tube sections 38 made from thermomechanical ceramic allows to avoid the problem set by the heat deformations to which the outer tubular shell 12 is subjected. The specific structural features of the invention therefore take quite well into account the coefficients of expansion and the thoroughly different behaviours at high temperature of the various component parts of the system according to the invention. The latter makes it possible to use parts made from thermomechanical ceramic in the hotest portions of the system. These materials indeed would accept operating temperatures of 1,400° hence 300° to 400° more than in the burners with a high outflow velocity of the burnt gases which are presently known and in which even the hearth tube and the inner tubular element of the radiant tube are made from refractory steel. The invention makes it possible to fully recover the heat from the burnt gases by providing an effect of preheating the combustion air. At last, the shape of the hearth tube 1 according to the invention makes it possible to substantially reduce the rate of production of nitrogen oxides as will be set forth hereinafter. To achieve the reduction of the rate of production of nitrogen oxides according to the invention, use is made of the fact that the generation of nitrogen oxide in accordance with the ratio of the amount of combustion air actually admitted into the combustion chamber to the stoechiometric amount of air required for an instantaneous complete combustion would vary according to a bell-shaped curve, the rate of nitrogen oxide being maximum when this ratio is equal to 1. According to the invention, the problem of the reduction of the rate of production of nitrogen oxide is solved by providing a combustion in steps or stages within the combustion chamber 2 owing to the various combustion air feed planes which are axially offset in the direction of flow of the gaseous fluid within the chamber, the air feeds being arranged in counter-rotating relationship from one plane to another one. The gas is introduced radially into the combustion chamber.

Figure 3:
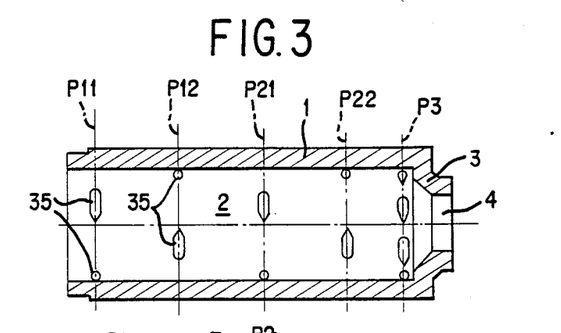
FIGS. 3 to 5 are views in axial section of three alternative embodiments, respectively, of a hearth tube according to the present invention.
Figure 4:
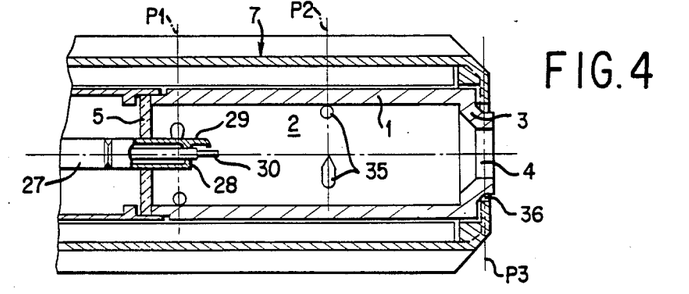
Figure 5:
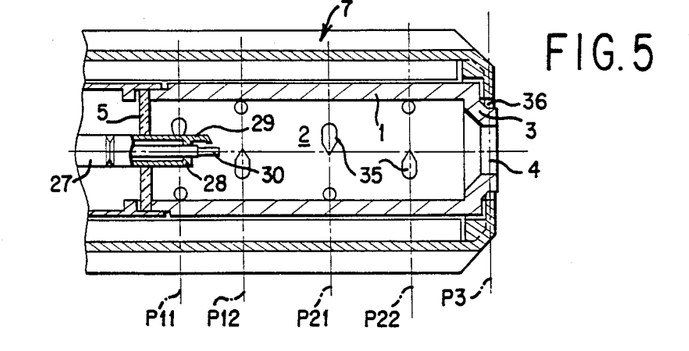

In the burner according to the invention, in a first stage or step, the gas is mixed with the combustion air flowing into the chamber at the first plane according to FIGS. 1 and 4 or at the two first planes according to FIGS. 3 and 5 and which is driven or pushed against the wall of the combustion chamber 2 by its being set in rotary motion by the tangential feed holes or ports 35. With this first mixture is initiated or started the combustion which is incomplete and not very strong. In a second step or stage, i.e. at the second air feed plane according to FIGS. 1 and 4 or at the third and fourth planes according to FIGS. 3 and 5, the air is added in counter-rotating relationship to the burning mixture thus inducing a substantial stirring motion. This would result in substantially accelerating the combustion while keeping an air-to-gas ratio substantially different from 1 so as to reduce the production of nitrogen oxides. In a third step or stage, the combustion would end by the supply of air in the last air feed plane still set into rotary motion and driven or pushed against the wall by the tangential holes or, in the case of FIGS. 3 and 5, by injection of the air into the flame at the outlet of the burner. This tangential air arrival on several axially offset levels into the combustion chamber 2 makes it possible on the one hand to achieve a complete combustion within a chamber of restricted volume owing to this strong stirring motion induced by the air feeds moving in counter-rotating relationship and, on the other hand, to reduce the production of nitrogen oxides by carrying out the combustion in steps or stages.

Burnt gases which would be exhausted or are issuing from the burner at a high speed are injected into the inner ceramic tube 38 which consists of a number of sections freely connected by coupling sleeves 39 which allow an axial offset between adjacent sections for instance by a few degrees so as to not impair or interfere with the creep and the deformations of the tubular shell 12, these coupling elements allowing, owing to their ribs 42, to position and to center the inner tube 38 within the tubular shall 12. The ear-like cutouts 43 at both ends of the inner tube 38 would promote the recirculation of the burnt gases.

What is claimed is:

1. A burner system in particular with a high outlet velocity of the burnt gases, comprising: a central hearth tube defining a combustion chamber in which is admitted a mixture of combustible gas and of combustion-supporting gas such as air; a tubular element coaxially surrounding said hearth tube so as to form an annular space thereabout to allow flow of combustion-supporting air to be admitted into the hearth tube; the hearth tube having an outlet end and the outlet end being formed with a reduced portion made from thermomechanical ceramic for increasing the outlet speed of the gases; the tubular element having an outlet end having a radial restriction which forms an axial and radial positioning stop for the hearth tube, the hearth tube being axially biased into assembly with the other component parts of the burner by an assembly means for producing an axial pressure force under the impact of which the hearth tube bears against said stop through a radial shoulder provided in the reduced portion of the hearth tube, the system further comprising a tube made from a metal alloy, the tube having a portion adjacent to said hearth tube with substantially the same diameter as said hearth tube and the tube being axially aligned with the hearth tube inside of said tubular element and a duct extending in the tube, the duct feeding gas to said combustion chamber; and a burner shell, said assembling means producing an axial assembling force between said tube and a stationary portion of the burner shell, the assembling means comprising first and second annular magnets, each of the magnets having ends of opposite polarity, the first magnet being arranged on said tube and the second magnet being mounted on the shell of the burner in confronting relation to said first magnet in the axial direction of the burner so that the ends with the same magnetic polarity of the magnets are in an axially confronting relationship to produce an axial repelling force.

2. A system according to claim 1, wherein said combustion chamber is closed on the side opposite to the gas outlet by a transparent disc which extends at right angles to the centre line axis of said hearth tube and at least one window is provided in the shell of the burner, the window being transparent to ultraviolet radiations such that the flame is visible through the disc and window.

3. A system according to claim 1, wherein the duct for feeding gas to the combustion chamber is open at an end which is inside of said combustion chamber so that the flame may be directly controlled from the outside.

4. A system according to claim 3, further comprising ignition means which comprise a high voltage electrode extending in parallel relation to the gas feed duct at the open end of the duct inside of the combustion chamber whereas the earthed electrode consists of said duct.

5. A system according to claim 1, comprising a tube made from a metal alloy and having a portion inside of said chamber substantially the same diameter as said hearth tube which is axially aligned with the hearth tube inside of said tubular element and in which extends the duct for supplying gas to the combustion chamber.

6. A system according to claim 5, wherein that portion of the gas feed tube which is located inside of the combustion chamber comprises a number of radial gas outlet ports and high voltage type ignition means which comprise an earthed electrode welded to said duct whereas the high voltage electrode is located along the centre line axis of said duct.

7. A system according to claim 1, wherein said hearth tube comprises a plurality of air feed planes which are axially offset, the air feed planes providing tangential introduction of air in counter-rotating relationship so as to provide a combustion in steps to reduce the rate of production of nitrogen oxides.

8. A system according to claim 7, wherein a plurality of said air feeds are located in a first zone of feed planes substantially at the gas feed and are adapted to provide for an incomplete combustion, a plurality of air feeds are located in a second zone of feed planes in counter-rotating relationship with respect to the air feeds of the first zone and are adapted to accelerate combustion without the air-to-gas ratio reaching the stoechiometric, and a plurality of air feeds are located in a third zone adapted to terminate the combustion.

9. A system according to claim 7, wherein one air feed plane comprises holes which are formed in the nose of the burner so as to inject the air directly into the flame at the outlet of the burner after said reduced portion, this air producing an additional cooling action upon the nose of the burner.

10. A system according to claim 7, wherein each air feed plane comprises a number of holes which extend through the wall of the hearth tube and are oriented tangentially within a plane extending at right angles to the centre line axis of said hearth tube and wherein the tangential orientations of said holes are opposite to each other from one plane to another one, the holes of one plane being angularly staggered with respect to the holes of the adjacent planes.

11. A system according to claim 10, wherein all the air feed holes open into the combustion chamber.

12. A burner system in particular with a high outlet velocity of the burnt gases, comprising: a central hearth tube defining a combustion chamber in which is admitted a mixture of combustible gas and of combustion-supporting gas such as air; a tubular element coaxially surrounding said hearth tube so as to form an annular space thereabout to allow flow of combustion-supporting air to be admitted into the hearth tube; the hearth tube having an outlet end and the outlet end being formed with a reduced portion made from thermomechanical ceramic for increasing the outlet speed of the gases, the tubular element having an outlet end having a radial restriction which forms an axial and radial positioning stop for the hearth tube, the hearth tube being axially biased into assembly with the other component parts of the burner by an assembly means for producing an axial pressure force under the impact of which the hearth tube bears against said stop through a radial shoulder provided in the reduced portion of the hearth tube, the system further comprising a tube made from a metal alloy, the tube having a first end portion adjacent to said hearth tube with substantially the same diameter as said hearth tube and is axially aligned with the hearth tube inside of said tubular element and a duct extending in the tube, the duct feeding gas to said combustion chamber; and a burner shell, said assembling means producing an axial assembling force between said tube and a stationary portion of the burner shell, the assembling means comprising a magnet mounted on the outer surface of said tube at a location near a metal portion of the burner shell on a second end portion of said tube which is opposite to the first end to produce an axial pulling force between this magnet and said metal part.

13. A burner system in particular with a high outlet velocity of the burnt gases, comprising; a central hearth tube defining a combustion chamber in which is admitted a mixture of combustible gas and of combustion-supporting gas such as air, the combustion chamber having a gas outlet end and an end opposite the gas outlet; a tubular element coaxially surrounding said hearth tube so as to form an annular space thereabout to allow flow of combustion-supporting air to be admitted into the hearth tube; the hearth tube having an outlet end, the outlet end being formed with a reduced portion made from thermomechanical ceramic for increasing the outlet speed of the gases; the tubular element having an outlet end having a radial restriction which forms an axial and radial positioning stop for the hearth tube, the hearth tube being axially biased into assembly with the other component parts of the burner by an assembly means for producing an axial pressure force under the impact of which the hearth tube bears against said stop through a radial shoulder provided in the reduced portion of the hearth tube, the system further comprising a tube made from a metal alloy, the tube having a portion adjacent to said hearth tube with substantially the same diameter as said hearth tube and the tube being axially aligned with the hearth tube inside of said tubular element and in a duct extending in the tube, feeding gas to said combustion chamber; and a burner shell, said assembling means producing an axial assembling force between said tube and a stationary portion of the burner shell, wherein said combustion chamber is closed on the end opposite to the gas outlet by a transparent disc which extends at right angles to the center line axis of said hearth tube; and at least one window provided in the shell of the burner, the window being transparent to ultraviolet radiations such that the flame is visible through the transparent disc and window.

14. A burner system in particular with a high outlet velocity of the burnt gases, comprising; a central hearth tube defining a combustion chamber in which is admitted the mixture of combustible gas and of combustion-supporting gas such as air; a tubular element coaxially surrounding said hearth tube so as to form an annular space thereabout to allow flow of combustion-supporting air to be admitted into the hearth tube; the hearth tube having an outlet end and the outlet end being formed with a reduced portion made from thermomechanical ceramic for increasing the outlet speed of the gases; the tubular element having an outlet end having a radial restriction which forms an axial and radial positioning stop for the hearth tube, the hearth tube being axially biased into assembly with the other component parts of the burner by an assembly means adapted for producing an axial pressure force under the impact of which the hearth tube bears against said stop through a radial shoulder provided in the reduced portion of the hearth tube, the system comprising a tube made from a metal alloy, the tube having a portion adjacent to said hearth tube with substantially the same diameter as said hearth tube and the tube being axially aligned with the hearth tube inside of said tubular element and a duct extending in the tube, the duct feeding gas to said combustion chamber; and a burner shell, said assembling means producing an axial assembling force between said tube and a stationary portion of the burner shell; said burner being a regenerative type burner and comprising an outer tubular shell which forms an annular space about said tubular element for recirculating burnt gases, a heating device comprising a glove finger-shaped radiant tube, the radiant tube including a tubular outer shell having an axial extension which forms the outer tubular shell of the burner and an inner ceramic tube located in axial extension of the hearth tube, the inner ceramic tube comprising a plurality of sections axially connected by pivotal connecting means providing a flexible coupling.

15. A system according to claim 14, wherein said assembling means comprises a magnet mounted onto the outer surface of said tube at a location near a metal portion of the shell to produce an axial pulling force between the magnet and said metal part.

16. A system according to claim 14, wherein said tubular element comprises a finned heat exchanger tube separating combustion air flow from burnt gases flowing in counter-current relation to this air flow.

17. A system according to claim 14, wherein said inner tube comprises radial ribs for centering it inside of said tubular shell.

18. A system according to claim 14, wherein said inner tube comprises at its ends ears for promoting the circulation of the gases.

19. A system according to claim 14, wherein a tube section has inner and outer diameters which are constant throughout the axial length of the section.

20. A system according to claim 14, wherein the tube sections are arranged end-to-end and said pivotal connecting means each comprise a sleeve coaxially surrounding the ends of the sections to be interconnected, the radially inner surface of the sleeve comprising a radially inwardly projecting collar which fits between two tube sections while having the same inner diameter as said collar whereas those inner surface portions which are located on either side of said collar are expanded toward the ends of said sleeve so as to allow an axial offset of the tube sections interconnected by said sleeve, the sleeve carrying on its outer surface ribs for centering the sleeve inside of said tubular shell.

21. A system according to claim 20, wherein the length of that portion of one sleeve which axially overlaps one tube section is greater than the sum of the axial play between the tube and the adjacent elements and the various sections.

* * * * *